(12) United States Patent
Jeon et al.

(10) Patent No.: US 9,377,571 B2
(45) Date of Patent: Jun. 28, 2016

(54) OPTICAL FILM

(75) Inventors: Byoung Kun Jeon, Daejeon (KR); Hyuk Yoon, Gwangmyeong-si (KR); Su Young Ryu, Daejeon (KR); Moon Soo Park, Daejeon (KR)

(73) Assignee: LG CHEM, LTD., Seoul (KR)

(*) Notice: Subject to any disclaimer, the term of this patent is extended or adjusted under 35 U.S.C. 154(b) by 363 days.

(21) Appl. No.: 13/567,803

(22) Filed: Aug. 6, 2012

(65) Prior Publication Data

US 2014/0247487 A1 Sep. 4, 2014

(30) Foreign Application Priority Data

Aug. 5, 2011 (KR) .................... 10-2011-0077987

(51) Int. Cl.
*G02B 5/30* (2006.01)
*G02F 1/13363* (2006.01)

(52) U.S. Cl.
CPC ........ *G02B 5/3083* (2013.01); *G02F 1/133634* (2013.01); *G02F 2001/133637* (2013.01)

(58) Field of Classification Search
CPC .... G02B 5/305; G02B 5/3083; G02B 5/3008; G02B 5/3016; G02B 5/32; G02B 27/281; G02B 27/288; G02B 27/142
USPC ............. 359/489.07, 489.11, 489.12, 489.13, 359/337.5, 483.01, 489.01, 489.02, 494.01, 359/615; 349/117–121, 194
See application file for complete search history.

(56) References Cited

U.S. PATENT DOCUMENTS

2007/0242188 A1* 10/2007 Sakai .............................. 349/96
2012/0003400 A1* 1/2012 Nishimura .............. B32B 27/08
428/1.1

FOREIGN PATENT DOCUMENTS

| CN | 101852950 A | 10/2010 | |
| JP | 2002-040258 A | 2/2002 | |
| JP | 2004-184575 | 7/2004 | |
| JP | 2005-055601 A | 3/2005 | |
| JP | 2007-233215 | 9/2007 | |
| WO | WO/2010/092926 | * 8/2010 | ........... G02B 5/3016 |

OTHER PUBLICATIONS

English language translation of Arakawa JP 2002-040258 japanese patent document (of record).*

* cited by examiner

*Primary Examiner* — Thomas K Pham
*Assistant Examiner* — Marin Pichler
(74) *Attorney, Agent, or Firm* — Dentons US LLP

(57) ABSTRACT

An optical film, a polarizing plate and a display device are provided. The optical film can have desired phase retardation at a wide wavelength range, and also show no light leakage at an inclination angle. Also, the optical film can have ¼-wavelength phase retardation, and can be used for reflective or semi-transmissive/reflective liquid crystal display devices or organic light-emitting devices.

17 Claims, 4 Drawing Sheets

OPTICAL FILM

This application is a Utility Application which claims priority to and the benefit of Korean Patent Application No. 10-2011-0077987, filed on Aug. 5, 2011, which is hereby incorporated by reference in its entirety herein

FIELD

The present application relates to an optical film, a polarizing plate and a display device.

BACKGROUND

A retardation film may be, for example, disposed at one or both sides of a liquid crystal cell so as to improve viewing angle characteristics of liquid crystal display devices (LCDs), as described in Japanese Patent Laid-open Publication No. 1996-321381. The retardation film may also be used in reflective LCDs or organic light emitting devices (OLEDs) to prevent reflection of external light and secure visibility.

Retardation films are divided into ½-wavelength or ¼-wavelength retardation films, depending on phase retardation. Conventional ½- or ¼-wavelength retardation films have a phase difference which varies according to their wavelengths. Therefore, the wavelength range at which the ½- or ¼-wavelength retardation films may exert action may be limited to a certain wavelength range. For example, a film that functions as a ¼-wavelength retardation film with respect to light with a 550 nm wavelength may not often function as the ¼-wavelength retardation film with respect to light with a 450 nm or 650 nm wavelength.

SUMMARY

The present application relates to an optical film, a polarizing plate and a display device.

One illustrative optical film may include a positive biaxial phase retardation layer and an optical anisotropic layer. For example, the optical anisotropic layer may be a uniaxial or biaxial phase retardation layer.

The term "uniaxial phase retardation layer or uniaxial retardation film" as used herein may refer to a layer or film in which two among the refractive index (hereinafter referred to as "Nx") of an x-axis direction, the refractive index (hereinafter referred to as "Ny") of a y-axis direction and the refractive index (hereinafter referred to as "Nz") of a z-axis direction are identical to each other, and the other is different from one of the two refractive indexes. In this specification, the term "identical" may refer to "substantially identical." As such, the term "x-axis" as used herein may refer to a certain direction on a plane of the phase retardation layer or film, the term "y-axis" as used herein may refer to a direction on the plane perpendicular to the "x-axis," and the term "z-axis" as used herein may refer to a direction parallel to a normal of a plane formed by the x-axis and the y-axis, for example, a thickness direction of the phase retardation layer or film, as show in FIG. 1. In one embodiment, the x-axis may be a direction parallel to the slow axis of the phase retardation layer or film, and the y-axis may be a direction parallel to the fast axis of the phase retardation layer or film.

The uniaxial phase retardation layer or film that satisfies the following Expression 1 may be referred to as a "positive uniaxial phase retardation layer or film," and the uniaxial phase retardation layer or film that satisfies the following Expression 2 may be referred to as a "negative uniaxial phase retardation layer or film."

$Nx \neq Ny = Nz$ [Expression 1]

$Nx = Nz \neq Ny$ [Expression 2]

The term "biaxial phase retardation layer or biaxial retardation film" as used herein may refer to a layer or film, in which all of the refractive indexes Nx, Ny and Nz are different to each other. Also, the biaxial phase retardation layer or biaxial phase retardation film that satisfies the following Expression 3 may be referred to as a "positive biaxial phase retardation layer or film," and the biaxial phase retardation layer or biaxial phase retardation film that satisfies the following Expression 4 may be referred to as a "negative biaxial phase retardation layer or film."

$Nx \neq Ny < Nz$ [Expression 3]

$Nx \neq Ny > Nz$ [Expression 4]

In one embodiment, the positive biaxial phase retardation layer and the optical anisotropic layer may be laminated with each other. FIG. 2 shows a schematic of one illustrative embodiment of the optical film 1, showing a state where a positive biaxial phase retardation layer 101 and an optical anisotropic layer 102 are laminated with each other.

An optical axis of the positive biaxial phase retardation layer may be perpendicular to that of the optical anisotropic layer. The term "optical axis" as used herein may refer to a slow axis or fast axis, and may refer to a slow axis unless expressly stated otherwise. In this specification, the terms "vertical," "perpendicular," "horizontal" and "parallel" refer to a state where certain two axes or directions are substantially vertical, perpendicular, horizontal and parallel to each other within a range in which the predetermined effects are not adversely affected. Thus, each of the terms may include, for example, an error within approximately ±15 degrees, ±10 degrees, ±5 degrees or ±3 degrees.

The optical film, the positive biaxial phase retardation layer and the optical anisotropic layer in the optical film may satisfy the following Expressions 5 to 7:

$|R_1(\lambda)| > |R_2(\lambda)|$ [Expression 5]

$R_1(\lambda)/R_1(550) < R_2(\lambda)/R_2(550)$ [Expression 6]

$R(450)/R(550) < R(650)/R(550)$ [Expression 7]

In Expression 5, $|R_1(\lambda)|$ represents an absolute value of a phase difference of one (hereinafter referred to as a "first film") among the positive biaxial phase retardation layer and the optical anisotropic layer with respect to light with λ nm wavelengths, and $|R_2(\lambda)|$ represents an absolute value of a phase difference of the other (hereinafter referred to as a "second film") of the positive biaxial phase retardation layer and the optical anisotropic layer with respect to light with λ nm wavelengths. As such, the phase difference may be, for example, an in-plane phase difference or a phase difference in thickness direction. Unless expressly stated otherwise, the phase difference may be an in-plane phase difference.

In Expression 6, $R_1(\lambda)$ represents a phase difference of the first film with respect to light with λ nm wavelengths, and $R_2(\lambda)$ represents a phase difference of the second film with respect to light with λ nm wavelengths.

The symbol "$R(\lambda)$" may refer to a phase difference, for example in-plane phase difference, of the optical film, the phase retardation layer or the retardation film, as measured with respect to the light with λ nm wavelengths. Therefore, $R_1(550)$ in Expression 6 represents a phase difference, for example in-plane phase difference, of the first film with respect to light with a 550 nm wavelength, and $R_2(550)$ represents a phase difference, for example in-plane phase difference, of the second film with respect to light with a 550 nm wavelength.

Further, R(450) in Expression 7 represents a phase difference, for example in-plane phase difference, of the optical film with respect to light with a 450 nm wavelength, R(550) represents a phase difference, for example in-plane phase difference, of the optical film with respect to light with a 550 nm wavelength, and R(650) represents a phase difference, for example in-plane phase difference, of the optical film with respect to light with a 650 nm wavelength.

In this specification, the in-plane phase difference of the optical film, the phase retardation layer or the retardation film may be a value calculated by the following Expression 8, and the phase difference in thickness direction may be a value calculated by the following Expression 9.

$$RI = d \times (Nx - Ny) \qquad \text{[Expression 8]}$$

$$RT = d \times (Nz - Ny) \qquad \text{[Expression 9]}$$

In Expressions 8 and 9, the "RI" represents the in-plane phase difference, the "RT" represents the phase difference in thickness direction, the "d" represents the thickness of the optical film, the phase retardation layer or the retardation film, and the "Nx," the "Ny" and the "Nz" represent refractive indexes in x-axis, y-axis and z-axis directions, respectively, as defined above.

When an optical film is formed by laminating the positive biaxial phase retardation layer and the optical anisotropic layer, both of which satisfy Expressions 5 to 7, the optical film may have good reverse wavelength dispersion characteristics. That is, if the positive biaxial phase retardation layer and the optical anisotropic layer are laminated so as for the optical axes thereof to be perpendicular to each other, and so as for the $R(\lambda)/R(550)$ of one film of which absolute value of the in-plane phase difference is larger than that of the other film to be smaller than the $R(\lambda)/R(550)$ of the other film according to the Expressions 5 and 6, the optical film having reverse wavelength dispersion characteristics may be provided, as represented by Expression 7.

When the optical film has reverse wavelength dispersion characteristics, the R(650)/R(550) value of the optical film may be higher than the R(450)/R(550) value, as in Expression 7. For example, the R(450)/R(550) value of the optical film may be in a range of 0.81 to 0.99, 0.82 to 0.98, 0.83 to 0.97, 0.84 to 0.96, 0.85 to 0.95, 0.86 to 0.94, 0.87 to 0.93, 0.88 to 0.92, or 0.89 to 0.91, and the R(650)/R(550) value is higher than R(450)/R(550) value, and, for example, may be in a range of 1.01 to 1.19, 1.02 to 1.18, 1.03 to 1.17, 1.04 to 1.16, 1.05 to 1.15, 1.06 to 1.14, 1.07 to 1.13, 1.08 to 1.12, or 1.09 to 1.11.

For example, the optical film may have ¼-wavelength phase retardation. The term "n-wavelength phase retardation" as used herein may refer to a property capable of phase retarding light incident thereon by n times wavelengths of the light within at least a certain wavelength range. In one embodiment, the optical film may have an in-plane phase difference in a range from approximately 100 nm to 250 nm, 100 nm to 220 nm, 100 nm to 200 nm, or 140 nm to 170 nm with respect to light having a wavelength of 550 nm.

For example, a light leakage intensity of the optical film, which is measured under a state where the optical film is positioned on one side of a liner polarizer such as a light absorptive linear polarizer and is measured at an inclination angle of 50 degrees, may be, for example, approximately 0.1 AU (arbitrary unit) or less, 0.08 AU or less, 0.07 AU or less, 0.06 AU or less, 0.05 AU or less, or 0.04 AU or less. For example, the light leakage intensity may be the intensity of light leakage which is measured at the linear polarizer's side by irradiating the optical film with light under a state where the optical film is positioned on one side of the linear polarizer. Also, the light leakage intensity is the intensity measured at an inclination angle of 50 degrees, and measured at all azimuthal angles. The intensity may be measured according to a method described in Examples as will be described below. The terms "inclination angle" and "azimuthal angle" as used herein may be explained by referring to FIG. 3, as follows. For example, when it is assumed that a plane (xy plane) formed by the x-axis and y-axis in FIG. 3 is a surface of a film or layer, the inclination angle may be an angle (the "θ" in FIG. 3) formed by a normal of the xy plane, i.e., the z-axis direction and a viewing direction (P) as shown in FIG. 3. Further, the azimuthal angle may also refer to an angle (the "ϕ" in FIG. 3) formed between the x-axis and a projection of the viewing direction (P) on the xy plane.

When the light leakage intensity is adjusted as described above, an optical film having excellent visual characteristics at inclination angles may be provided.

For example, the positive biaxial phase retardation layer of the optical film may have ½-wavelength phase retardation or ¼-wavelength phase retardation, for example, ½-wavelength phase retardation. When the positive biaxial phase retardation layer has the ½-wavelength phase retardation, the in-plane phase difference of the positive biaxial phase retardation layer with respect to light with a 550 nm wavelength may be in a range from 200 nm to 290 nm, or from 220 nm to 270 nm. When the positive biaxial phase retardation layer has the ¼-wavelength phase retardation, the in-plane phase difference with respect to light with a 550 nm wavelength may be in a range from 95 nm to 145 nm, or from 105 nm to 120 nm.

To improve visual characteristics of the optical film at the inclination angles, the phase difference (RT) in thickness direction of the positive biaxial phase retardation layer may be adjusted so that the ratio (RT/RI) of the phase difference (RT) in thickness direction with respect to the in-plane phase difference (RI) may fall within predetermined ranges. For example, the ratio (RT/RI) may be determined according to the kind of optical anisotropic layer included in the optical film along with the positive biaxial phase retardation layer.

In one embodiment, the ratio (RT/RI) of the phase difference (RT) in thickness direction to the in-plane phase difference (RI) of the positive biaxial phase retardation layer may be more than 0 and also not more than 3, or may be less than 3. The ratio (RT/RI) may be, for example, more than 0 and not more than 2.5 or may be more than 0 and not more than 2.

For example, the ratio (RT/RI) may be adjusted according to the kind of optical anisotropic layer included in the optical film along with the positive biaxial phase retardation layer. For example, when the optical anisotropic layer is the uniaxial phase retardation layer, the ratio (RT/RI) may be, for example, more than 0 and also not more than 1.1. When the uniaxial phase retardation layer is the positive uniaxial phase retardation layer, the ratio (RT/RI) may be in a range from 0.3 to 1.1, from 0.4 to 0.9, from 0.5 to 0.9, or approximately 0.7. Also, when the uniaxial phase retardation layer is the negative uniaxial phase retardation layer, the ratio (RT/RI) may be more than 0 and also not more than 1, or in a range from 0.05 to 0.6, from 0.1 to 0.45, or approximately 0.3.

Also, when the optical anisotropic layer is the biaxial phase retardation layer, the ratio (RT/RI) may be, for example, more than 0 and also not more than 2. When the biaxial phase retardation layer is the positive biaxial phase retardation layer, the ratio (RT/RI) may be more than 0 and not more than 1.5, or in a range from 0.2 to 0.8, from 0.3 to 0.7, or from 0.4 to 0.6, or approximately 0.5. Also, when the biaxial phase retardation layer is the negative biaxial phase retardation layer, the ratio (RT/RI) may be, for example, more than 0 and also not more than 2, or in a range from 0.7 to 1.1, or from 0.8 to 1.1, or approximately 0.9.

When the phase difference ratio (RT/RI) of the positive biaxial retardation film is adjusted as described above, films having excellent visual characteristics at the inclination angles may be provided.

For example, the positive biaxial phase retardation layer may be a polymer film or a liquid crystal film. For example, the biaxial phase retardation layer may be formed as a film obtained by elongating a transparent polymer film, to which the optical anisotropy may be given by elongation, using a proper method. Also, a non-elongated polymer film may be used herein as long as it has the optical anisotropy. In one embodiment, a film manufactured using an absorbent casting method, which has a light transmissivity of 70% or more, 80% or more or 85% or more, may be used as the polymer film. In general, a film having a thickness of approximately 3 mm or less, 1 µm to 1 mm or 5 µm to 500 µm may be used as the polymer film in consideration of the probability of forming a uniform elongation film.

For example, the polymer film that may be used herein may include a polyolefin film such as a polyethylene or polypropylene film, a cycloolefin polymer (COP) film such as a polynorbonene film, a poly(vinyl chloride) film, a polyacrylonitrile film, a polysulfone film, a polyacrylate film, a poly(vinyl alcohol) (PVA) film or a cellulose ester polymer film such as a triacetyl cellulose (TAC) film, or a copolymer film including at least two of monomers used to form the above described polymer. In one embodiment, the cycloolefin polymer film may be used as the polymer film. As such, the cycloolefin polymer that may be used herein may include, but is not limited to, a ring-opening polymer of a cycloolefin such as norbonene or a hydrogenated product thereof, an addition polymer of a cycloolefin, a copolymer of a cycloolefin and another comonomer such as a-olefin, or a graft polymer obtained by modifying the polymer or copolymer with unsaturated carboxylic acid or a derivative thereof. The positive biaxial phase retardation layer may be formed using a liquid crystal film which has been known in the related art to form the positive biaxial phase retardation layer.

For example, the positive biaxial phase retardation layer may have a thickness of approximately 1 mm or less, 1 µm to 500 µm, or 5 µm to 300 µm. However, the thickness of the positive biaxial phase retardation layer may vary according to the purpose of use.

In the optical film, for example, the optical anisotropic layer included with the positive biaxial phase retardation layer may have ½-wavelength phase retardation or ¼-wavelength phase retardation. For example, when the positive biaxial phase retardation layer has ½-wavelength phase retardation, the optical anisotropic layer may have ¼-wavelength phase retardation, whereas, when the positive biaxial phase retardation layer has ¼-wavelength phase retardation, the optical anisotropic layer may have ½-wavelength phase retardation. When the optical anisotropic layer has ½-wavelength phase retardation, the optical anisotropic layer may have an in-plane phase difference of 200 nm to 290 nm or 220 nm to 270 nm with respect to light with a 550 nm wavelength. When the optical anisotropic layer has ¼-wavelength phase retardation, the in-plane phase difference of the positive biaxial phase retardation layer with respect to light with a 550 nm wavelength may be in a range of 95 nm to 145 nm, or 105 nm to 120 nm.

For example, the optical anisotropic layer may be the uniaxial phase retardation layer or the biaxial phase retardation layer. The uniaxial phase retardation layer or biaxial phase retardation layer may be the positive or negative uniaxial phase retardation layer, or the positive or negative biaxial phase retardation layer. For example, the in-plane phase difference of the uniaxial or biaxial phase retardation layer may be selected within a range in which the optical anisotropic layer may have ½-wavelength phase retardation or ¼-wavelength phase retardation. Also, the phase difference in thickness direction of the negative uniaxial phase retardation layer or the positive or negative biaxial phase retardation layer may be properly selected within a range in which desired effects are not adversely affected. For example, the phase retardation layer has a phase difference in thickness direction of approximately −200 nm to 200 nm, −150 nm to 150 nm, −100 nm to 110 nm, or −60 nm to 110 nm.

For example, the optical anisotropic layer may be formed using a known polymer film or liquid crystal film such as a positive biaxial phase retardation layer as described above. The polymer film or the liquid crystal film that may be used to form a positive or negative uniaxial or biaxial phase retardation layer is widely known in the related art, and all of such films or layers may be used herein.

For example, the optical anisotropic layer may have a thickness of approximately 1 mm or less, 1 µm to 500 µm, or 5 µm to 300 µm, but it is particularly limited thereto.

For example, the positive biaxial phase retardation layer and the optical anisotropic layer may be attached by an appropriate pressure-sensitive adhesive or adhesive to form an optical film.

The present application also relates to a polarizing plate. One illustrative polarizing plate may include a linear polarizer and the optical film. Therefore, the polarizing plate may include the linear polarizer, the positive biaxial phase retardation layer and the optical anisotropic layer. As such, the details of the optical film, the positive biaxial phase retardation layer and the optical anisotropic layer are applicable in the same manner as in the contents as described above. In one embodiment, the optical anisotropic layer of the optical film is attached to one surface of the linear polarizer to form a polarizing plate. In this case, the polarizing plate may include the linear polarizer, the optical anisotropic layer and the positive biaxial phase retardation layer in this order. FIG. 4 shows a schematic of one illustrative embodiment of the polarizing plate 3 including a linear polarizer 301, an optical anisotropic layer 102 and a positive biaxial phase retardation layer 101 in this order.

As such, the linear polarizer is a functional device configured to extract light that oscillates in one direction from light that is incident thereon and that oscillates in all directions. For example, the linear polarizer may be a light absorptive linear polarizer known in the art. For example, a conventional linear polarizer such as a PVA (poly(vinyl alcohol)) based linear polarizer may be used as such a linear polarizer. In one embodiment, the linear polarizer may be a PVA film or sheet in which a dichroic dye or iodine is absorbed and oriented. The PVA may be obtained, for example, by gelling poly(vinyl acetate). The poly(vinyl acetate) that may be used herein may include a monopolymer of vinyl acetate, and a copolymer of vinyl acetate and the other monomer. As such, the other monomer which is copolymerized with vinyl acetate that may be used herein may include an unsaturated carboxylic acid compound, an olefin compound, a vinyl ether compound, an unsaturated sulfonic acid compound, and an acrylamide compound containing an ammonium group, which may be used alone or in combination. The poly(vinyl acetate) generally has a gelling degree of approximately 85 mole % to approximately 100 mole %, or 98 mole % to 100 mole %. The PVA in the linear polarizer may generally have a degree of polymerization of approximately 1,000 to approximately 10,000, or approximately 1,500 to approximately 5,000.

In the polarizing plate, for example, the light absorption axis of the linear polarizer and the optical axis of the positive biaxial phase retardation layer of the optical film may formed an angle of approximately 45 degrees. In the optical film, the optical axis of the positive biaxial phase retardation layer may be formed to be perpendicular to the optical axis of the optical anisotropic layer, as already described above.

For example, the polarizing plate may have a light leakage intensity, which is measured from the linear polarizer and is measured at the inclination angle of 50 degrees, in a range of 0.1 AU or less, 0.08 AU or less, 0.07 AU or less, 0.06 AU or less, 0.05 AU, or less or 0.04 AU or less. For example, the light leakage intensity may be the intensity of light that is leaked from the linear polarizer when the optical film is irradiated with light. Also, the light leakage intensity may be the intensity of light leaked at the inclination angle of 50 degrees and at all azimuthal angles. Accordingly, a polarizing plate having excellent visual characteristics at an inclination angle may be provided.

In the polarizing plate, the linear polarizer and the optical film may be, for example, attached to each other using a proper pressure-sensitive adhesive layer or adhesive layer known in the art. In the polarizing plate, the optical film and the linear polarizer may be directly attached by means of the adhesive layer or pressure-sensitive adhesive layer, and may be indirectly attached after a primer layer is further included between the linear polarizer and the adhesive layer, or between the optical film and the adhesive layer, as necessary.

A method of attaching the optical film to the linear polarizer is not particularly limited. For example, the optical film and the linear polarizer may be attached to each other by coating one surface of the linear polarizer or optical film with an adhesive or pressure-sensitive adhesive composition, laminating the optical film with the linear polarizer and curing the adhesive composition, or laminating the optical film with the linear polarizer with an adhesive or pressure-sensitive adhesive composition using a dropping method, and curing the adhesive composition. As such, the curing of the composition may be performed by irradiating the adhesive composition with an active energy line having a proper intensity at a proper light intensity in consideration of components included in the composition.

Also, the polarizing plate may be present at one surface of the linear polarizer, for example, a surface opposite a surface of the linear polarizer that comes in contact with the optical film, or may further include a protective layer configured to protect the linear polarizers present at both surfaces of the linear polarizer.

The present application also relates to a display device. One illustrative display device may include the polarizing plate.

Specific kinds of the display device including the polarizing plate are not particularly limited. For example, the display device may be a liquid crystal display device such as a reflective or semi-transmissive/reflective liquid crystal display device, or an organic light-emitting device.

In the display device, the arrangement of the polarizing plate is not particularly limited, but the polarizing plate may be, for example, arranged in a structure known in the art. For example, one of the polarizing plates of the liquid crystal panel may be used in the reflective liquid crystal display device so as to prevent reflection of external light and secure visibility. Also, in the organic light-emitting device, the polarizing plate may be arranged outside of an electrode layer of the organic light-emitting device so as to prevent reflection of external light and secure visibility.

EFFECT

Illustrative optical film may have desired phase retardation at wide wavelength ranges, and also show no light leakage at inclination angles. For example, the optical film can have ¼-wavelength phase retardation, and can be used for reflective or semi-transmissive/reflective liquid crystal display devices or organic light-emitting devices.

THE MARKS IN THE DRAWINGS

Figure 1:
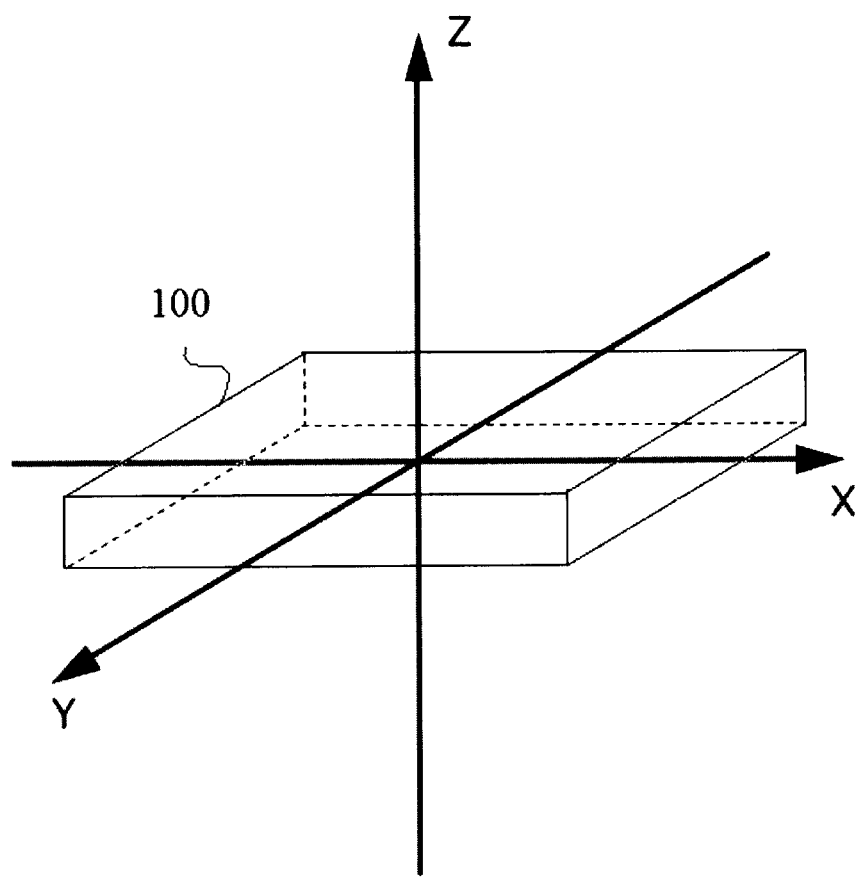
FIG. 1 shows a schematic showing the x, y and z axes of an optical anisotropic layer or film.
Figure 2:
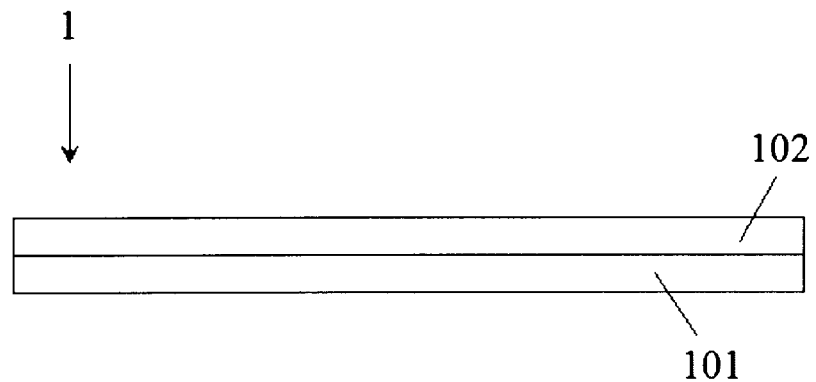
FIG. 2 shows a schematic of one illustrative embodiment of the optical film.
Figure 3:
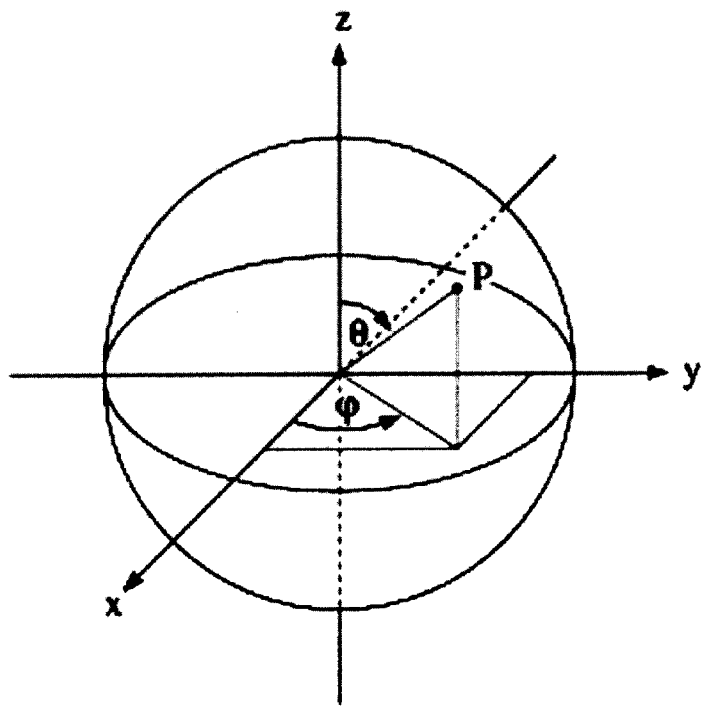
FIG. 3 shows a diagram for explaining the inclination angle and the azimuthal angle.
Figure 4:
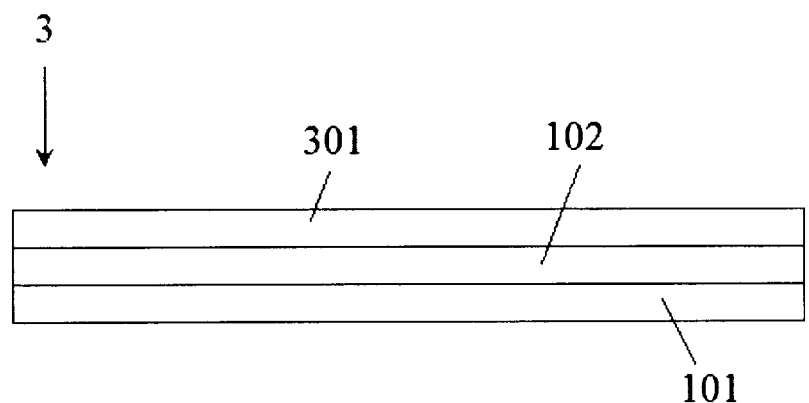
FIG. 4 shows a schematic of one illustrative embodiment of the polarizing plate.

1: the optical film
101: the positive biaxial phase retardation layer
102: the uniaxial or biaxial phase retardation layer
3: the polarizing plate
301: the polarizer

DETAILED DESCRIPTION OF EXEMPLARY EMBODIMENTS

Hereinafter, the optical films will be described in further detail with reference to Examples and Comparative Examples. However, the scope of the optical film is not intended to limit the examples as will be described below.

1. In-plane Phase Difference or Phase Difference in Thickness Direction

The in-plane phase difference or phase difference in thickness direction of the optical film was measured with respect to light having a wavelength of 550 nm using Axoscan equipment (commercially available from Axomatrics) that can measure 16 Muller matrices. The 16 Muller matrices were measuring according to the manufacturer's manual using the Axoscan equipment, and the phase differences were extracted from the measured Muller matrices.

2. Measurement of Light Leakage Intensity

The light leakage intensity at the inclination angle of 50 degrees was measured by attaching each of the optical films in the following Examples or Comparative Examples on one side of a PVA-based polarizer, measuring the reflectivity at the inclination angle of 50 degrees using a spectrometer (N&K), and then measuring the intensity of light leaked from the PVA based polarizer at all azimuthal angles. The light leakage intensity was specified as the arbitrary unit (AU), relative to the maximum brightness (control) at all the azimuthal angles.

Example 1

Figure 5:
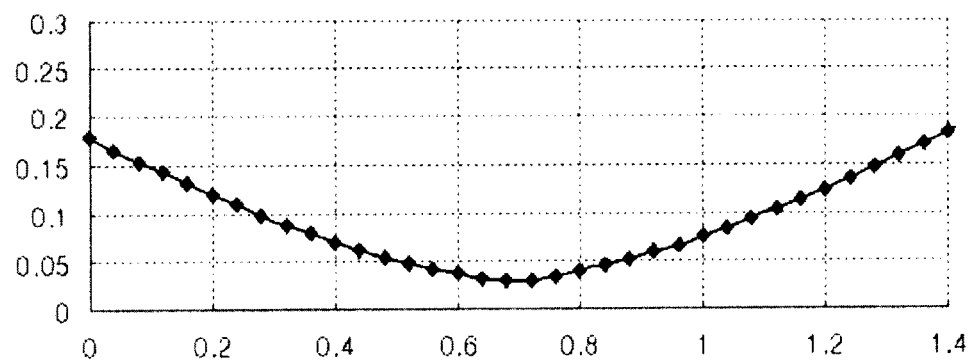
FIGS. 5 to 8 show the results obtained by measuring light leakage intensities of optical films of Examples 1 to 4, respectively.

An optical film was prepared by attaching a COP (cycloolefin polymer) film having an in-plane phase difference of approximately 250 nm as the positive biaxial phase retardation layer to a liquid crystal film having an in-plane phase difference of approximately 105 nm as the positive uniaxial layer so as for the slow axis of the positive biaxial phase retardation layer to be vertical to the slow axis of the positive uniaxial phase retardation layer. The optical film has a total in-plane phase difference of approximately 145 nm. The positive uniaxial phase retardation layer of the optical film was attached to the PVA based polarizer to prepare a polarizing plate, and the intensity of light leaked from the PVA based polarizer was measured using the above-described method while the optical film was irradiated with light by changing the ratio (RT/RI) of the phase difference (RT) in thickness direction to the in-plane phase difference (RI) of the positive biaxial phase retardation layer. The measurement results are shown in FIG. 5, The positive biaxial phase retardation layer was attached to the PVA based polarizer so that the light absorption axis of the PVA based polarizer was formed counterclockwise at an angle of approximately 45 degrees relative to the slow axis of the positive biaxial phase retardation layer when the light absorption axis of the PVA based polarizer and the slow axis of the positive biaxial phase retardation layer were viewed from the PVA based polarizer during the manufacture of the polarizing plate. In FIG. 5, the y-axis represents the light leakage intensity (units: AU) at an angle at which maximum light leakage takes place at the inclination angle 50 degrees and all azimuthal angles measured under the above-described conditions, and the x-axis represents a ratio (RT/RI) of a phase difference (RT) in thickness direction to an in-plane phase difference (RI) of the positive biaxial phase retardation layer.

Example 2

Figure 6:
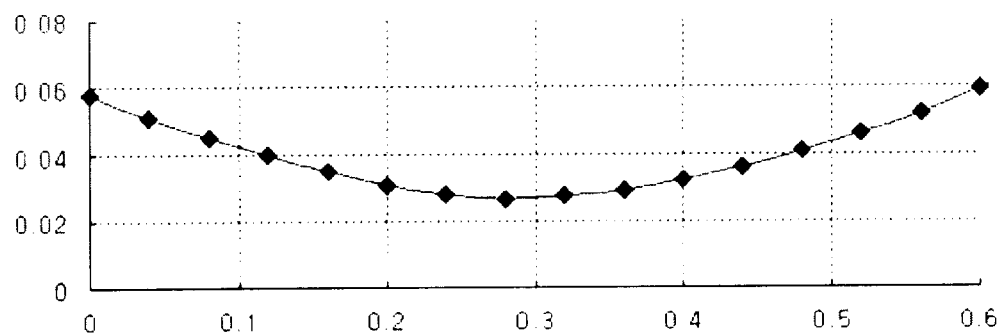

An optical film was prepared by attaching the positive biaxial phase retardation layer as was used in Example 1 on a COP (cycloolefin polymer) film having an in-plane phase difference of approximately 105 nm and a phase difference in thickness direction of approximately 105 nm as the negative uniaxial phase retardation layer so as for the slow axis of the positive biaxial phase retardation layer and the slow axis of the negative uniaxial phase retardation layer to be perpendicular to each other. The optical film had a total in-plane phase difference of approximately 145 nm. The negative uniaxial phase retardation layer of the optical film was attached to the PVA based polarizer to prepare a polarizing plate, and the intensity of light leakage was measured in the same manner as in Example 1 by changing the ratio (RT/RI) of the phase difference (RT) in thickness direction to the in-plane phase difference (RI) of the positive biaxial phase retardation layer. The measurement results are shown in FIG. 6. The positive biaxial phase retardation layer was attached to the PVA based polarizer so that the light absorption axis of the PVA based polarizer was formed counterclockwise at an angle of approximately 45 degrees relative to the slow axis of the positive biaxial phase retardation layer when the light absorption axis of the PVA based polarizer and the slow axis of the positive biaxial phase retardation layer were viewed from the PVA based polarizer during the manufacture of the polarizing plate. In FIG. 6, the y-axis represents the light leakage intensity (units: AU) at an angle at which maximum light leakage takes place at an inclination angle 50 degrees and all azimuthal angles measured under the above-described conditions, and the x-axis represents a ratio (RT/RI) of a phase difference (RT) in thickness direction to an in-plane phase difference (RI) of the positive biaxial phase retardation layer.

Example 3

Figure 7:
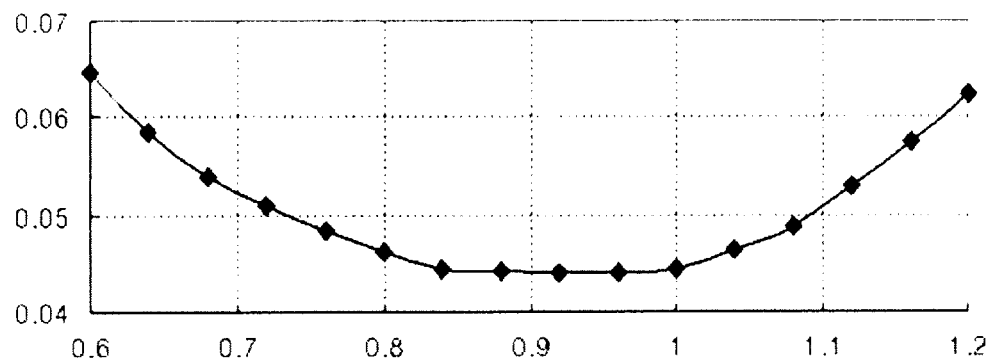

An optical film was prepared by attaching the same positive biaxial phase retardation layer as used in Example 1 on a COP (cycloolefin polymer) film having an in-plane phase difference of approximately 105 nm and a phase difference in thickness direction of approximately −50 nm as the negative uniaxial phase retardation layer so as for the slow axis of the positive biaxial phase retardation layer to be perpendicular to the slow axis of the negative uniaxial phase retardation layer. The optical film had a total in-plane phase difference of approximately 145 nm. The negative biaxial phase retardation layer of the optical film was attached to the PVA based polarizer to prepare a polarizing plate, and the intensity of light leakage was measured in the same manner as in Example 1 by changing the ratio (RT/RI) of the phase difference (RT) in thickness direction to the in-plane phase difference (RI) of the positive biaxial phase retardation layer. The measurement results are shown in FIG. 7. The positive biaxial phase retardation layer was attached to the PVA based polarizer so that the light absorption axis of the PVA based polarizer was formed counterclockwise at an angle of approximately 45 degrees relative to the slow axis of the positive biaxial phase retardation layer when the light absorption axis of the PVA based polarizer and the slow axis of the positive biaxial phase retardation layer were viewed from the PVA based polarizer in the case of the polarizing plate. In FIG. 7, the y-axis represents the light leakage intensity (units: AU) at an angle at which maximum light leakage takes place among an inclination angle 50 degrees and all azimuthal angles measured under the above-described conditions, and the x-axis represents a ratio (RT/RI) of a phase difference (RT) in thickness direction to an in-plane phase difference (RI) of the positive biaxial phase retardation layer.

Example 4

Figure 8:
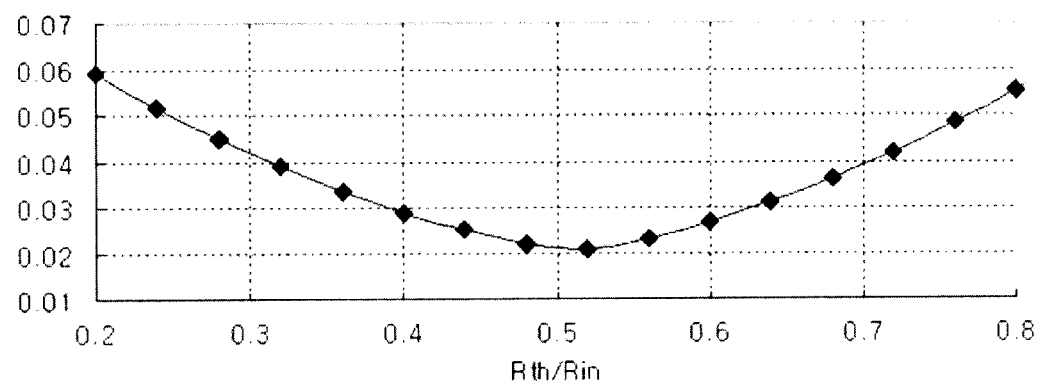

An optical film was prepared by attaching the same positive biaxial phase retardation layer as used in Example 1 on a COP film having an in-plane phase difference of approximately 105 nm and a phase difference in thickness direction of approximately 50 nm as the positive biaxial phase retardation layer so as for the slow axis of the COP film to be perpendicular to the slow axis of the positive biaxial phase retardation layer. The optical film had a total in-plane phase difference of approximately 145 nm. In the optical film, the positive biaxial phase retardation layer having an in-plane phase difference of 105 nm was attached to the PVA based polarizer to prepare a polarizing plate, and the intensity of light leakage was measured in the same manner as in Example 1 by changing the ratio (RT/RI) of the phase difference (RT) in thickness direction to the in-plane phase difference (RI) of the positive biaxial phase retardation layer having an in-plane phase difference of 250 nm. The measurement results are shown in FIG. 8. The positive biaxial phase retardation layer was attached to the PVA based polarizer so that the light absorption axis of the PVA based polarizer was formed counterclockwise at an angle of approximately 45 degrees relative to the slow axis of the positive biaxial phase retardation layer having an in-plane phase difference of approximately 250 nm when the light absorption axis of the PVA based polarizer and the slow axis of the positive biaxial phase retardation layer were viewed from the PVA based polarizer during the manufacture of the polarizing plate. In FIG. 8, the y-axis represents light leakage intensity (units: AU) at an angle at which maximum light leakage takes place among an inclination angle 50 degrees and all azimuthal angles measured under the above-described conditions, and the x-axis represents a ratio (RT/RI) of a phase difference (RT) in thickness direction to an in-plane phase difference (RI) of the positive biaxial phase retardation layer.

Comparative Example 1

Figure 9:
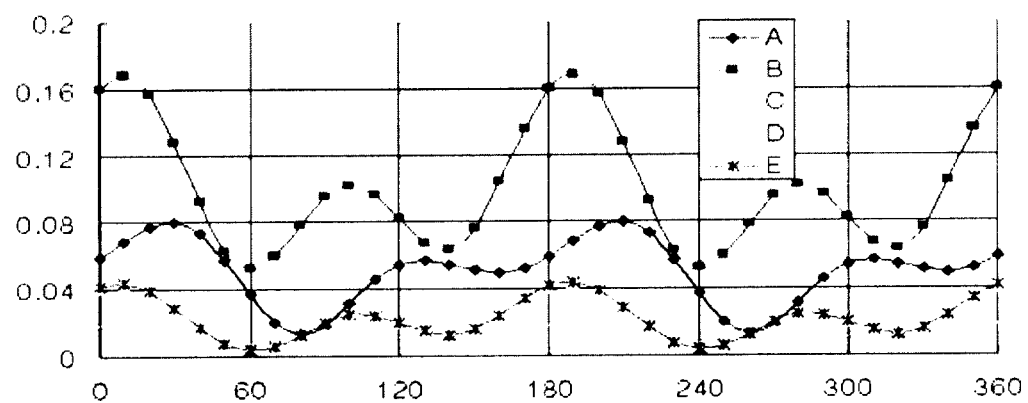
FIG. 9 shows the results obtained by measuring light leakage intensities of optical films of Comparative Examples 1 to 4 and Example 1, respectively.

An optical film was prepared by attaching a positive uniaxial phase retardation layer (a COP film) having an in-plane phase difference of approximately 250 nm to a positive uniaxial phase retardation layer (a liquid crystal film) having an in-plane phase difference of approximately 105 nm so as for the slow axes of the positive uniaxial phase retardation layer and the positive uniaxial phase retardation layer to be perpendicular to each other. The optical film had a total in-plane phase difference of approximately 145 nm. In the optical film, the uniaxial phase retardation layer having an in-plane phase difference of 105 nm was attached to the PVA based polarizer to prepare a polarizing plate, and the intensity of light leaked from the PVA based polarizer was measured at all the azimuthal angles in the same manner as described above by irradiating the optical film with light. The positive uniaxial phase retardation layer was attached to the PVA based polarizer so that the light absorption axis of the PVA based polarizer was formed counterclockwise at an angle of approximately 45 degrees relative to the slow axis of the positive uniaxial phase retardation layer having an in-plane phase difference of approximately 250 nm when the light absorption axis of the PVA based polarizer and the slow axis of the positive uniaxial phase retardation layer were viewed from the PVA based polarizer during the manufacture of the polarizing plate. The light leakage intensity of the optical film of Comparative Example 1 at all the azimuthal angles as measured at an inclination angle of 50 degrees was plotted as Graph B, as shown in FIG. 9. In FIG. 9, the y-axis represents light leakage intensity (units: AU), and the x-axis represents an azimuthal angle. The light leakage intensity with respect to the optical film (In the case of the positive biaxial phase retardation layer having an RT/RI of approximately 0.7) prepared in Example 1 was determined as well.

Comparative Example 2

An optical film was prepared by attaching a negative uniaxial phase retardation layer (a COP film) having an in-plane phase difference of approximately 250 nm and a phase difference in thickness direction of approximately 125 nm on a positive uniaxial phase retardation layer (a liquid crystal film) having an in-plane phase difference of approximately 105 nm so as for the slow axes of the negative uniaxial phase retardation layer and the positive uniaxial phase retardation layer to be perpendicular to each other. The optical film had a total in-plane phase difference of approximately 145 nm. The positive uniaxial phase retardation layer of the optical film was attached to the PVA based polarizer to prepare a polarizing plate, and the intensity of light leakage was measured in the same manner as in Comparative Example 1. The positive uniaxial phase retardation layer was attached to the PVA based polarizer so that the light absorption axis of the PVA based polarizer was formed counterclockwise at an angle of approximately 45 degrees relative to the slow axis of the positive uniaxial phase retardation layer having an in-plane phase difference of approximately 250 nm when the light absorption axis of the PVA based polarizer and the slow axis of the positive uniaxial phase retardation layer were viewed from the PVA based polarizer during the manufacture of the polarizing plate. The light leakage intensity of the optical film of Comparative Example 2 at all the azimuthal angles as measured at an inclination angle of 50 degrees was also determined.

Comparative Example 3

A polarizing plate was prepared by attaching the polycarbonate-based wide-band retardation film (WRF, commercially available from Teijin) to a PVA based polarizer, and the intensity of light leakage was measured in the same manner as in Comparative Example 1. The light leakage intensity of the optical film of Comparative Example 3 at all the azimuthal angles as measured at an inclination angle of 50 degrees was plotted as Graph E, as shown in FIG. 9.

Comparative Example 4

A polarizing plate was prepared by attaching a positive uniaxial retardation film having an in-plane phase difference of approximately 250 nm to one surface of a PVA based polarizer so that the slow axis of the positive uniaxial retardation film was formed clockwise at an angle of approximately 15 degrees relative to the light absorption axis of the PVA based polarizer, and attaching a positive uniaxial retardation film having an in-plane phase difference of approximately 105 nm to one surface of the positive uniaxial retardation film so that the slow axis of the positive uniaxial retardation film was formed clockwise at an angle of approximately 75 degrees relative to the light absorption axis of the PVA based polarizer. Thereafter, the intensity of light leakage was measured in the same manner as in Comparative Example 1. The light leakage intensity of the optical film of Comparative Example 3 at all the azimuthal angles as measured at an inclination angle of 50 degrees was plotted as Graph A, as shown in FIG. 9.

What is claimed is:
1. An optical film, comprising:
a laminate comprising a positive biaxial phase retardation layer, and an optical anisotropic layer selected from the group consisting of a positive uniaxial phase retardation layer, a negative uniaxial phase retardation layer, a positive biaxial phase retardation layer, and a negative biaxial phase retardation layer;
wherein the positive biaxial phase retardation layer and the optical anisotropic layer are in direct contact, separated by an adhesive, or separated by a pressure-sensitive adhesive, wherein an optical axis of the positive biaxial phase retardation layer is perpendicular to an optical axis of the optical anisotropic layer, and wherein "perpendicular" includes an error within approximately ±15 degrees and "optical axis" refers to a slow axis;
wherein the positive uniaxial phase retardation layer satisfies following Expression 1, the negative uniaxial phase retardation layer satisfies following Expression 2, the positive biaxial phase retardation layer satisfies following Expression 3, and the negative biaxial phase retardation layer satisfies following Expression 4:

$$Nx \neq Ny = Nz \quad \text{[Expression 1]}$$

$$Nx = Nz \neq Ny \quad \text{[Expression 2]}$$

$$Nx \neq Ny < Nz \quad \text{[Expression 3]}$$

$$Nx \neq Ny > Nz \quad \text{[Expression 4]}$$

wherein Nx, Ny and Nz respectively refer to a refractive index of an x-axis direction, a refractive index of a y-axis direction, and a refractive index of a z-axis direction of the positive uniaxial phase retardation layer, the negative uniaxial phase retardation layer, the positive biaxial phase retardation layer, or the negative biaxial phase retardation layer, and "z-axis" refers to a thickness direction of the optical anisotropic layer, "x-axis" refers to a direction parallel to the slow axis of the optical anisotropic layer, and "y-axis" refers to a direction parallel to the fast axis of the optical anisotropic layer;

wherein the laminate satisfies Expressions 5 to 7:

$|R_1(\lambda)| > |R_2(\lambda)|$ [Expression 5]

$R_1(\lambda)/R_1(550) < R_2(\lambda)/R_2(550)$, when $\lambda$ is not 550 nm [Expression 6]

$R(450)/R(550) < R(650)/R(550)$ [Expression 7]

wherein $|R_1(\lambda)|$ represents an absolute value of an in-plane phase difference of one of the positive biaxial phase retardation layer and the optical anisotropic layer with respect to light having a wavelength of $\lambda$ nm; $|R_2(\lambda)|$ represents an absolute value of an in-plane phase difference of the other of the positive biaxial phase retardation layer and the optical anisotropic layer with respect to light having the wavelength of $\lambda$ nm; $R_1(\lambda)$ and $R_1(550)$ represent in-plane phase differences with respect to light having the wavelength of $\lambda$ nm and 550 nm, respectively, of the layer having $|R1(\lambda)|$ in Expression 5; $R_2(\lambda)$ and $R_2(550)$ represent in-plane differences with respect to light having the wavelength of $\lambda$, nm and 550 nm, respectively, of the layer having $|R2(\lambda)|$ in Expression 5; and R(450), R(550), and R(650) represent in-plane phase differences of the optical film with respect to light having a wavelength of 450 nm, 550 nm and 650 nm, respectively; and wherein R(550) is in a range from 100 nm to 250 nm.

2. The optical film of claim 1, wherein the positive biaxial phase retardation layer has an in-plane phase difference of 200 nm to 290 nm with respect to light with a 550 nm wavelength.

3. The optical film of claim 1, wherein a ratio (RT/RI) of the phase difference (RT) in thickness direction of the positive biaxial phase retardation layer to the in-plane phase difference (RI) of the positive biaxial phase retardation layer is greater than 0 and not more than 3.

4. The optical film of claim 1, wherein the ratio (RT/RI) of the phase difference (RT) in thickness direction of the positive biaxial phase retardation layer to the in-plane phase difference (RI) of the positive biaxial phase retardation layer is greater than 0 and not more than 1.1, and the optical anisotropic layer is a uniaxial phase retardation layer.

5. The optical film of claim 1, wherein the ratio (RT/RI) of the phase difference (RT) in thickness direction of the positive biaxial phase retardation layer to the in-plane phase difference (RI) of the positive biaxial phase retardation layer is in a range of 0.3 to 1.1, and the optical anisotropic layer is a positive uniaxial phase retardation layer.

6. The optical film of claim 1, wherein the ratio (RT/RI) of the phase difference (RT) in thickness direction of the positive biaxial phase retardation layer to the in-plane phase difference (RI) of the positive biaxial phase retardation layer is greater than 0 and not more than 1, and the optical anisotropic layer is a negative uniaxial phase retardation layer.

7. The optical film of claim 1, wherein the ratio (RT/RI) of the phase difference (RT) in thickness direction of the positive biaxial phase retardation layer to the in-plane phase difference (RI) of the positive biaxial phase retardation layer is greater than 0 and not more than 2, and the optical anisotropic layer is a biaxial phase retardation layer.

8. The optical film of claim 1, wherein the ratio (RT/RI) of the phase difference (RT) in thickness direction of the positive biaxial phase retardation layer to the in-plane phase difference (RI) of the positive biaxial phase retardation layer is greater than 0 and not more than 1.5, and the optical anisotropic layer is a positive biaxial phase retardation layer.

9. The optical film of claim 1, wherein the ratio (RT/RI) of the phase difference (RT) in thickness direction of the positive biaxial phase retardation layer to the in-plane phase difference (RI) of the positive biaxial phase retardation layer is greater than 0 and not more than 2, and the optical anisotropic layer is a negative biaxial phase retardation layer.

10. The optical film of claim 1, wherein the optical anisotropic layer has an in-plane phase difference of 95 nm to 145 nm with respect to light with a 550 nm wavelength.

11. The optical film of claim 1, wherein the optical anisotropic layer has a phase difference in thickness direction of −200 nm to 200 nm.

12. A polarizing plate which comprises a linear polarizer and the optical film of claim 1.

13. The polarizing plate of claim 12, wherein a light absorption axis of the linear polarizer and the optical axis of the positive biaxial phase retardation layer form an angle of 45 degrees.

14. A display device comprising the polarizing plate of claim 12.

15. The display device of claim 14, which is a reflective liquid crystal display device, a semi-transmissive/reflective liquid crystal display device or an organic light-emitting device.

16. The optical film of claim 1, wherein the positive biaxial phase retardation layer and the optical anisotropic layer are separated by an adhesive, or separated by a pressure-sensitive adhesive.

17. The optical film of claim 1, wherein R(450)/R(550) value is in a range of 0.81 to 0.99, and R(650)/R(550) value is in a range of 1.01 to 1.19.

* * * * *